United States Patent
Masui

(10) Patent No.: US 6,809,952 B2
(45) Date of Patent: Oct. 26, 2004

(54) SEMICONDUCTOR INTEGRATED CIRCUIT, RADIO FREQUENCY IDENTIFICATION TRANSPONDER, AND NON-CONTACT IC CARD

(75) Inventor: Shoichi Masui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/330,063

(22) Filed: Dec. 30, 2002

(65) Prior Publication Data

US 2003/0183699 A1 Oct. 2, 2003

(30) Foreign Application Priority Data

Mar. 29, 2002 (JP) ........................................ 2002-096253

(51) Int. Cl.[7] .............................................. G11C 11/22
(52) U.S. Cl. ...................... 365/145; 365/227; 365/192; 365/189.05
(58) Field of Search .............................. 365/145, 227, 365/192, 189.05

(56) References Cited

U.S. PATENT DOCUMENTS 4,815,001 A * 3/1989 Uthe et al. .................. 700/212
6,081,438 A * 6/2000 Saint-Pierre et al. .......... 363/95
6,097,622 A * 8/2000 Shimizu et al. ............. 365/145
6,515,919 B1 * 2/2003 Lee ............................ 365/192
6,522,567 B2 * 2/2003 Iwanari ...................... 365/145

OTHER PUBLICATIONS

"A Survey of Circuit Innovations in Ferroelectric Random–Access Memories", Sheikholeslami et al, *Proceedings of the IEEE*, vol. 88, No. 5, May 2000, pp. 667–689.

* cited by examiner

Primary Examiner—Richard Elms
Assistant Examiner—Tuan T. Nguyen
(74) Attorney, Agent, or Firm—Arent Fox, PLLC.

(57) ABSTRACT

A rectifier circuit converts an alternating current into a direct-current voltage and outputs it as a power supply voltage. A ferroelectric holding circuit has a volatile holding circuit and a plurality of ferroelectric capacitors. Data held in the ferroelectric holding circuit has a read margin greater than that of data held in ferroelectric memory cells in a memory array. The ferroelectric holding circuit thus operates with reliability even if power that the semiconductor integrated circuit receives is low. Consequently, since the ferroelectric holding circuit is formed on the semiconductor integrated circuit to be implemented on an RFID transponder or a non-contact IC card, the communication range between the RFID transponder or non-contact IC card and a reader/writer can be extended.

24 Claims, 13 Drawing Sheets

SEMICONDUCTOR INTEGRATED CIRCUIT, RADIO FREQUENCY IDENTIFICATION TRANSPONDER, AND NON-CONTACT IC CARD

CROSS REFERENCE TO RELATED APPLICATION

The disclosure of the following priority application is herein incorporated for reference: Japanese Patent Application No. 2002-096253, filed Mar. 29, 2002.

BACKGROUND OF THE INVENTION

1. Field of the Invention

The present invention relates to a radio frequency identification transponder and a non-contact IC card for transmitting and receiving electric power and data by air. The present invention also relates to a semiconductor integrated circuit to be implemented on these radio frequency identification transponder and non-contact IC card.

2. Description of the Related Art

Recently, radio frequency identification transponders (hereinafter, referred to as RFID transponders) equipped with a non-contact interface have been put to use for automatic transport systems in factories, inventory management in retail stores, book stock management in libraries, and so on. In addition, such IC cards as an ID card that contains personal information and is equipped with a non-contact interface have been used in research laboratories, ticket gates of stations, and the like. RFID transponders and non-contact IC cards of this type are expected to be applied to bank cards, credit cards, resident registration cards, etc. in the future.

Among the radio interfaces of the RFID transponders and non-contact IC cards is a physical interface stated in ISO/IEC 15693 Part 2, which comes into widespread use. This interface has data transmission rates lower than those of ISO/IEC 14443 Part 2 defined separately (an interface for high performance non-contact smart cards) but communication ranges greater than those of ISO/IEC 14443 Part 2. Specifically, ISO/IEC 14443 Part 2 has communication ranges of the order of 10 cm while ISO/IEC 15693 Part 2 allows communication ranges of 50 cm and above. Consequently, ISO/IEC 15693 Part 2 is useful to transponders intended for security purposes such as theft prevention in particular.

According to the interface specifications of ISO/IEC 15693 Part 2, power and data are transmitted from a reader/writer to transponders by using a shortwave carrier frequency of 13.56 MHz. The modulation is of ASK method with two types of nominal modulation factors, 100% and 10%. Besides, data is transferred from the transponders to the reader/writer after ASK modulation (Manchester Coding) or FSK modulation. These various communication methods are registered as international standards.

For example, in a library, the reader/writer is built into a gate which is installed on a gateway. The reader/writer conducts radio communication with RFID transponders attached to books so that the books are prevented from theft. Here, the reader/writer transmits a specific request command at predetermined intervals. The RFID transponders, as they pass through the gate, receive power and the request command from the reader/writer. If the RFID transponders contain data indicating that the books are yet to be subjected to lending processing, the data indicating that the lending processing is yet to be done is transmitted from the RFID transponders to the reader/writer when the RFID transponders pass through the gate. The gate issues an alarm in response to the data from the RFID transponders, received by the reader/writer.

The RFID transponders and the non-contact IC cards implement ferroelectric memories or other nonvolatile memories as data recording media. Ferroelectric memories are nonvolatile memories which are electrically rewritable as if EEPROMs and flash memories are. When compared to the EEPROMs and flash memories, however, the ferroelectric memories are better suited for the application to RFID transponders and non-contact IC cards because their data write operations are rapid and require no high voltage.

Conventionally, the RFID transponders implement a ferroelectric memory which has a memory array containing a plurality of memory cells arranged in a matrix. Each of the memory cells has a ferroelectric capacitor and a transfer transistor. Otherwise, each of the memory cells can have two ferroelectric capacitors and two transfer transistors to improve reliability. The transfer transistor(s) of each memory cell is/are connected to a word line at the gate(s). The ferroelectric capacitor(s) of each memory cell is/are connected to a plate line at one end(s). The ferroelectric capacitor(s) of each memory cell is/are connected to a bit line(s) at the other end(s) through the transfer transistor(s).

The memory array has a plurality of word lines connected to the memory cells, a plurality of word line drivers for driving these word lines, a plurality of plate lines connected to the memory cells, a plurality of plate line drivers for driving these plate lines, a plurality of bit lines connected to the memory cells, and a plurality of sense amplifiers for amplifying the data on these bit lines. Then, in reading data from the ferroelectric memory, a word line driver, a plate line driver, and sense amplifiers are driving a plurality of the memory cells to select accessing memory cells.

Ferroelectric memories have been detailed in Ali Sheikholeslami and Glenn Gulak, "A Survey of Circuit Innovations in Ferroelectric Random-Access Memories", Proceedings of the IEEE, vol. 88, No. 5, pp. 667–689 (2000), etc.

The RFID transponders and the non-contact IC cards run on a power supply given from an external reader/writers. Consequently, for the sake of operation, the RFID transponders and the non-contact IC cards must be brought to a predetermined distance near the reader/writer. Meanwhile, the gate requires a predetermined breadth in consideration of wheelchair access and the like. The distance between the RFID transponders and the reader/writer tends to increase accordingly.

The power for the RFID transponders to receive from the reader/writer decreases with increasing distance between the reader/writer and the RFID transponders. For low power operation, the RFID transponder must be reduced in power consumption as much as possible.

In the conventional RFID transponders and non-contact IC cards, the ferroelectric memory operates upon access from the reader/writer. The ferroelectric memory, as mentioned above, needs to activate a plurality of memory cells, and sense amplifiers upon access. Since the plate lines and the bit lines are high in charge/discharge current, the RFID transponders and non-contact IC cards have the problem of high power consumption.

Besides, in the foregoing ferroelectric memory, voltage differences between bit lines, which vary with residual polarizations of the ferroelectric capacitors, are amplified through the sense amplifiers for data read. In read operations, the bit lines make voltage variations as low as around 200 mV with small read margins. It is therefore difficult to lower the power supply voltage. That is, the ferroelectric memory to be implemented on the RFID transponders and non-contact IC cards is required to reduce power consumption.

SUMMARY OF THE INVENTION

It is an object of the present invention to reduce the power consumption of such transponders as RFID transponders or non-contact IC cards, so as to extend the communication range between these transponders and the reader/writer.

Another object of the present invention is to reduce the power consumption of a semiconductor integrated circuit to be implemented on the RFID transponders, the non-contact IC cards, or the like.

Another object of the present invention is to ensure the operation of a security system that includes the RFID transponders or non-contact IC cards and a reader/writer for conducting radio communication with these transponders.

According to one of the aspects of the present invention, a semiconductor integrated circuit includes a rectifier circuit, a memory array having a plurality of ferroelectric memory cells, and a ferroelectric holding circuit. The rectifier circuit converts an alternating current into a direct-current voltage and outputs it as a power supply voltage. For example, an RFID transponder or non-contact IC card has an antenna coil for generating an alternating current for a magnetic field.

The ferroelectric holding circuit has a volatile holding circuit and a plurality of ferroelectric capacitors. Data held in the ferroelectric holding circuit has a read margin greater than that of data held in the ferroelectric memory cells in the memory array. The ferroelectric holding circuit thus operates with reliability even if the power that the semiconductor integrated circuit (RFID transponder, non-contact IC card) receives is low. Consequently, forming the ferroelectric holding circuit on the semiconductor integrated circuit to be implemented on an RFID transponder or a non-contact IC card makes it possible to extend the communication range between the RFID transponder or non-contact IC card and a reader/writer.

Owing to the extended communication range, implementation of the semiconductor integrated circuit of the present invention on the RFID transponder etc. realizes a surely operable security system (such as a merchandise antitheft system). In addition, lowering the output of the reader/writer results in reducing the influences of the electromagnetic waves, which are emitted from the reader/writer, on humans.

The semiconductor integrated circuit of the invention has two advantages of large capacity of the memory array and low power operation of the ferroelectric holding circuit. It is hence possible, for example, to operate the memory array having the ferroelectric memory cells when enough power is available, and to operate the ferroelectric holding circuit when only restricted power is available.

According to another aspect of the present invention, an internal voltage regulator generates an internal supply voltage that is lower than the power supply voltage output from the rectifier circuit. The ferroelectric holding circuit runs on the internal supply voltage. The ferroelectric holding circuit can thus be lowered in power consumption, allowing a reduction in the power consumption of the semiconductor integrated circuit. As a result, the semiconductor integrated circuit can operate with reliability even if its supplied power is low.

According to another aspect of the present invention, a data demodulator demodulates, from an alternating current, a read command for reading data from the ferroelectric holding circuit or ferroelectric memory. That is, the semiconductor integrated circuit can demodulate data from a received alternating current. A data modulator modulates read data, which are read from the memory array or the ferroelectric holding circuit, into an alternating current in accordance with the read command. That is, the semiconductor integrated circuit can modulate the data to be transmitted into an alternating current.

According to another aspect of the present invention, a control circuit reads out data held in the ferroelectric capacitors to the volatile holding circuit at the start of supply of the power supply voltage. In the absence of the power supply voltage, data is stored in the ferroelectric capacitors in terms of nonvolatile polarization, and in the presence thereof the polarization is transferred to the volatile holding circuit, therefore, the ferroelectric holding circuit can operate as a nonvolatile data memory circuit.

According to another aspect of the present invention, the ferroelectric holding circuit has a latch circuit formed therein with two buffer circuits connected to each other at their inputs and outputs. A pair of first ferroelectric capacitors are connected in series between a first plate line and a second plate line. An intermediate node connecting the two first ferroelectric capacitors is connected to the input of one of the buffer circuits. A pair of second ferroelectric capacitors are connected in series between the first plate line and the second plate line. An intermediate node connecting the two second ferroelectric capacitors is connected to the input of the other of the buffer circuits. Data, which has been held in the latch circuit before power-off, is held as residual polarizations of the ferroelectric capacitors. The ferroelectric holding circuit may also be applied to, for example, at least either one of a master latch circuit and a slave latch circuit which are connected in cascade to form a flip-flop circuit.

After power-on, for example, a second plate voltage is grounded and a first plate voltage is raised so that the intermediate node of the first ferroelectric capacitors and that of the second ferroelectric capacitors rise in voltage according to the capacitance divisions of these ferroelectric capacitors. That is, before the two buffer circuits are powered on, the inputs of these buffer circuits reach different voltages with each other. Subsequently, a switch circuit is turned on to power the latch circuit for activation. Logic data is written to the latch circuit according to the two input voltages. As a result, the data that have been transferred from the latch circuit to the ferroelectric capacitors before power-off can be reproduced. In short, a recall operation can be performed.

The foregoing recall operation consumes extremely low power as compared to that of a ferroelectric memory having a plurality of ferroelectric memory cells, word line drivers, plate line driver, sense amplifiers, and so on. More specifically, in a read operation of the ferroelectric memory, one of the word line drivers, one of the plate line drivers, the sense amplifiers, etc. are operated to access a number of memory cells connected to a word line. This requires high power even in reading a single bit of data, for example. In contrast, according to the ferroelectric holding circuit of the present invention, data is held in the simple latch circuit during supply of the power supply voltage. The first and second plate lines have only to drive the four ferroelectric capacitors in a recall operation. This allows a reduction in power consumption.

According to another aspect of the present invention, each of the ferroelectric memory cells of the memory array includes two ferroelectric capacitors and two transfer gates. The ferroelectric capacitors are each connected to a plate line at one end, and are connected to the source of the transistor (transfer gate), whose drain is connected to a bit line, at the other end. Since the memory array has the same configuration as that of an ordinary ferroelectric memory, the semiconductor integrated circuit can be increased in data memory capacity.

According to another aspect of the present invention, each of the ferroelectric memory cells of the memory array includes a ferroelectric capacitor and a transfer gate. The ferroelectric capacitor is connected to a plate line at one end, and is connected to the source of the transistor (transfer gate), whose drain is connected to a bit line. Since the memory array has the same configuration as that of an ordinary ferroelectric memory, the data memory capacity of the semiconductor integrated circuit can increase.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described with reference to the drawings.

Figure 1:
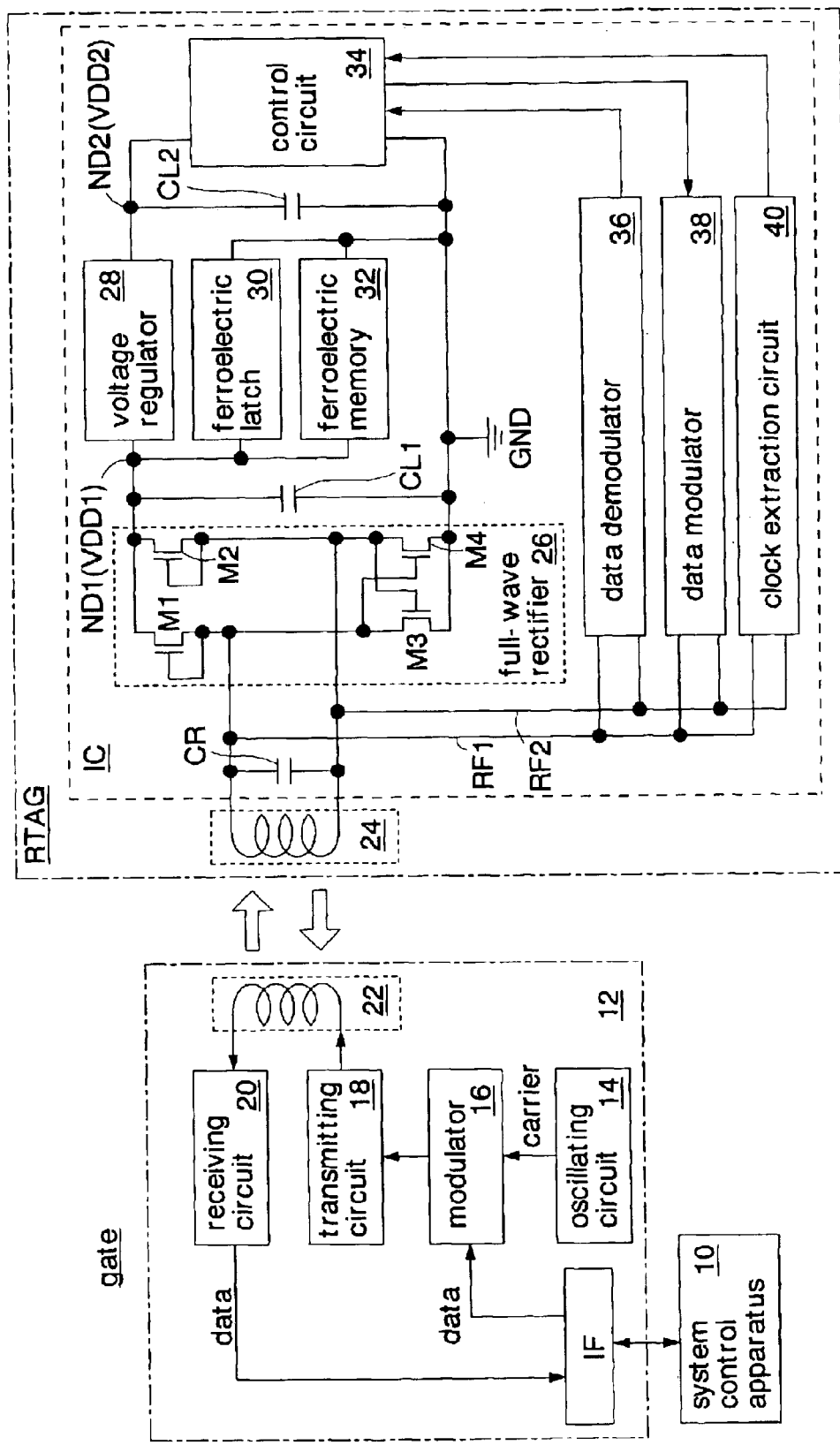
FIG. 1 is a block diagram showing a first embodiment of the present invention.

FIG. 1 shows a first embodiment of the present invention. FIG. 1 shows an antitheft system which includes a library gate incorporating a reader/writer and RFID transponders RTAG attached to books This antitheft system adopts ISO/IEC 15693 Part 2 for its communication interface. Nevertheless, the present invention is not dependent on communication interfaces but may adopt a variety of communication interfaces that are registered as international standards.

The gate includes a system control apparatus 10 such as a personal computer or an office computer, and a reader/writer 12. The reader/writer 12 has an interface IF to the system control apparatus 10, an oscillating circuit 14, a modulator 16, a transmitting circuit 18, a receiving circuit 20, and an antenna coil 22.

Data output from the system control apparatus 10 is transferred to the modulator 16 through the interface IF. The modulator 16 modulates the data in accordance with a carrier output from the oscillating circuit 14. The modulated data is transmitted through the transmitting circuit 18 and the antenna coil 22. Note that the antenna coil 22 also transmits power along with the modulated data.

Each RFID transponder RTAG has an antenna coil 24 and a semiconductor integrated circuit IC. The semiconductor integrated circuit IC has a full-wave rectifier 26, a voltage regulator 28, a ferroelectric latch 30 (ferroelectric holding circuit), a ferroelectric memory 32, a control circuit 34, a data demodulator 36, a data modulator 38, a clock extraction circuit 40, a tuning capacitor CR, and smoothing capacitors CL1 and CL2.

The full-wave rectifier 26 has four nMOS transistors M1, M2, M3, and M4, and rectifies an alternating-current wave (alternating current) received by the antenna coil 24. The charge resulting from the rectification is stored into the smoothing capacitor CL1. Because of the smoothing capacitor CL1, a stable power supply voltage VDD1 (for example, 3.3 V) occurs on the node ND1. The power supply voltage VDD1 is supplied to the voltage regulator 28, the ferroelectric latch 30, and the ferroelectric memory 32.

The voltage regulator 28 steps down the power supply voltage VDD1 to generate an internal supply voltage VDD2 (for example, 1.5 V) on the node ND2. Because of the smoothing capacitor CL2 which is connected between the node ND2 and a ground line, a stable internal supply voltage VDD2 is supplied to the control circuit 34 etc.

Figure 3:
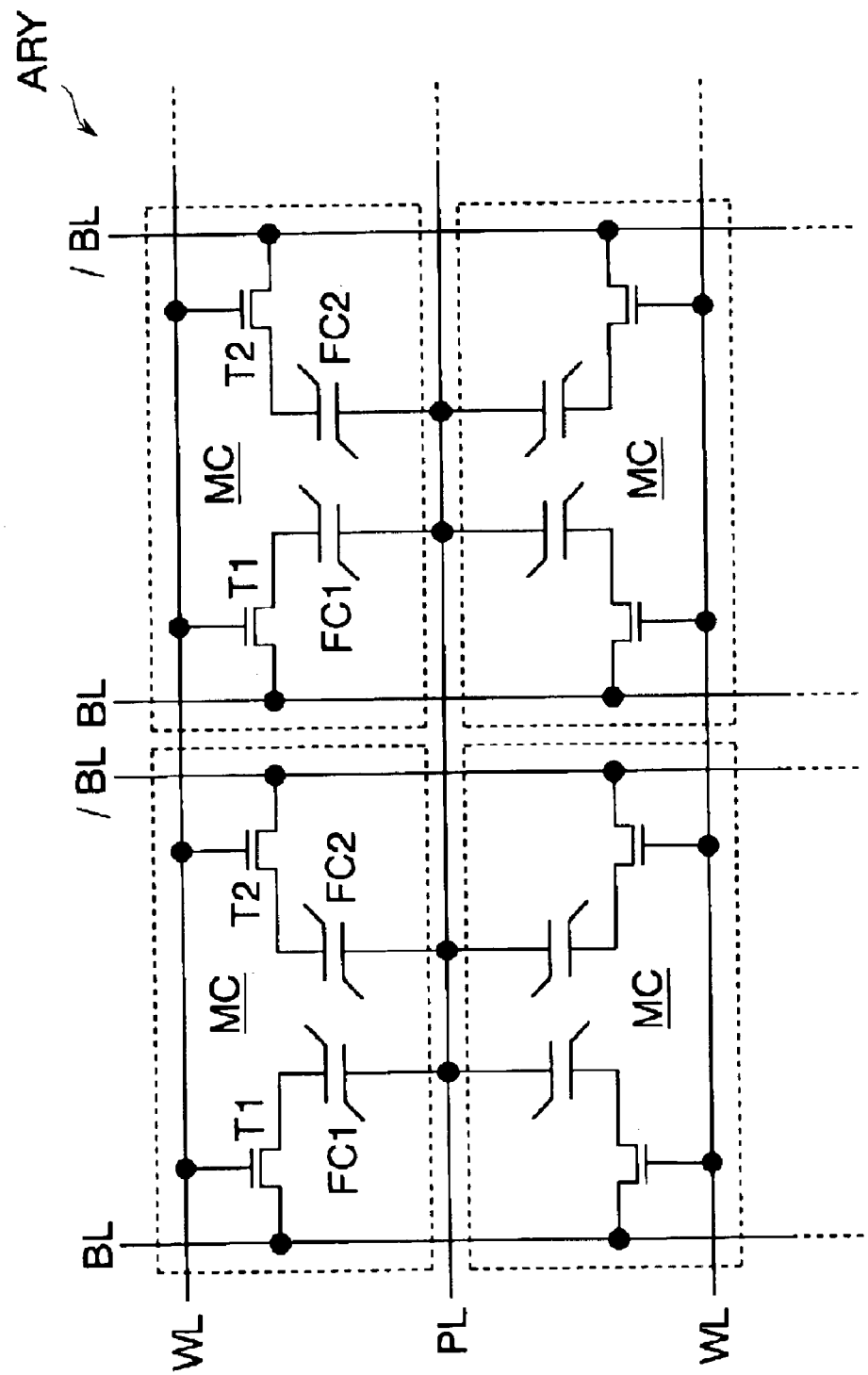
FIG. 3 is a circuit diagram example showing the details of the memory cells of FIG. 2.
Figure 4:
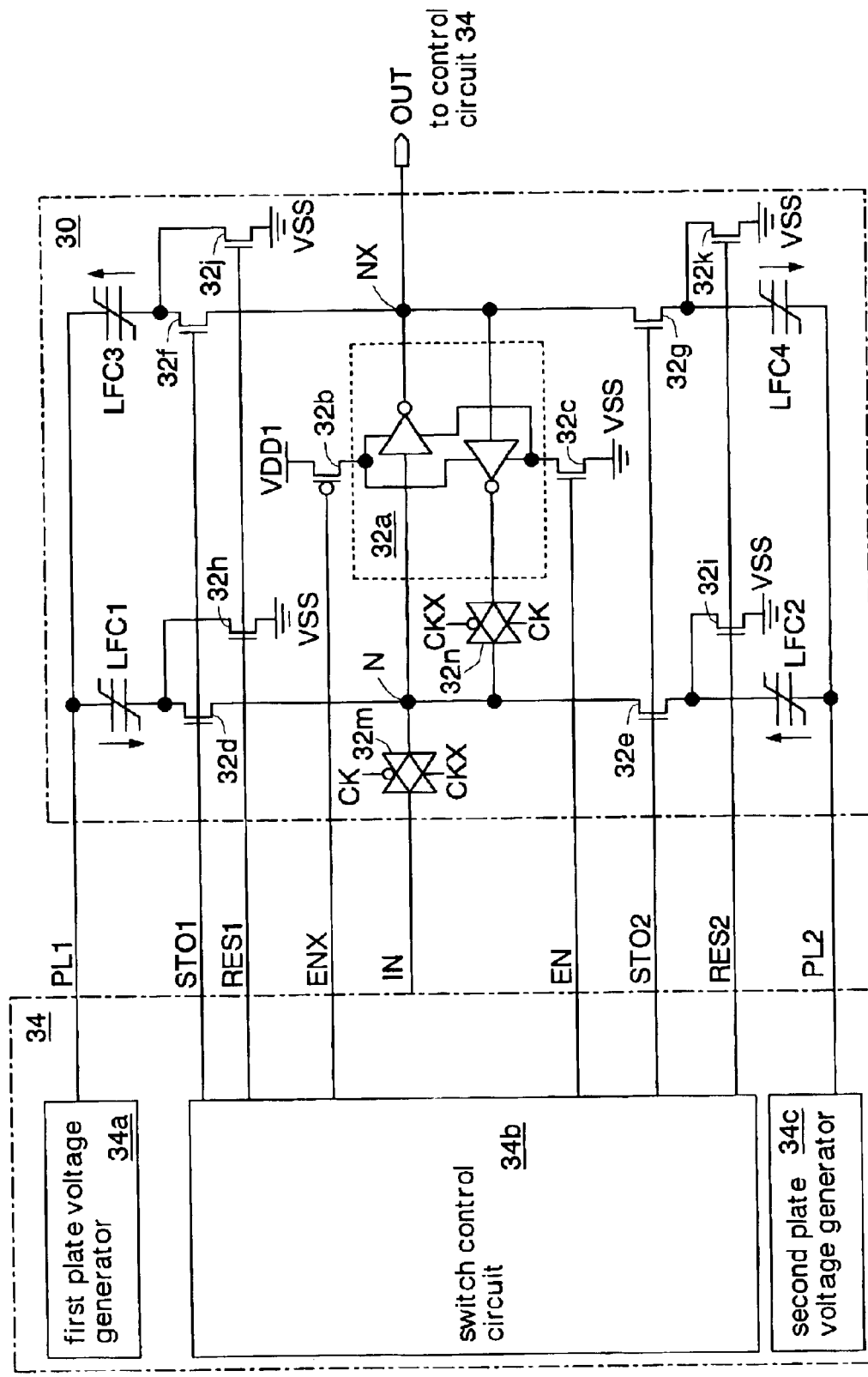
FIG. 4 is a circuit diagram showing the details of the ferroelectric latch of FIG. 1.

The ferroelectric latch 30 has a memory capacity of 1 bit, for example. The ferroelectric memory 32 has a memory capacity of 8 kbits, for example. The ferroelectric memory 32 and the ferroelectric latch 30 will be detailed later (FIGS. 2 through 4).

The control circuit 34 performs read and write operations on the ferroelectric memory 32 and the ferroelectric latch 30, and data input/output operations with the reader/writer 12. The control circuit 34 is composed of CMOS circuits, and thus runs with reliability even on the internal supply voltage VDD2 which is stepped down. Supplying the lower internal supply voltage VDD2 to the control circuit 34 can reduce the power consumption of the control circuit 34.

The data demodulator 36 demodulates the data received through the antenna coil 24, and outputs the demodulated data to the control circuit 34. The data modulator 38 modulates data supplied from the control circuit 36. The modulated data is output to the reader/writer 12 through the antenna coil 24. The clock extraction circuit 40 extracts and divides a clock out of the wave received by the antenna coil 24, and outputs the extracted clock to the control circuit 34.

Figure 2:
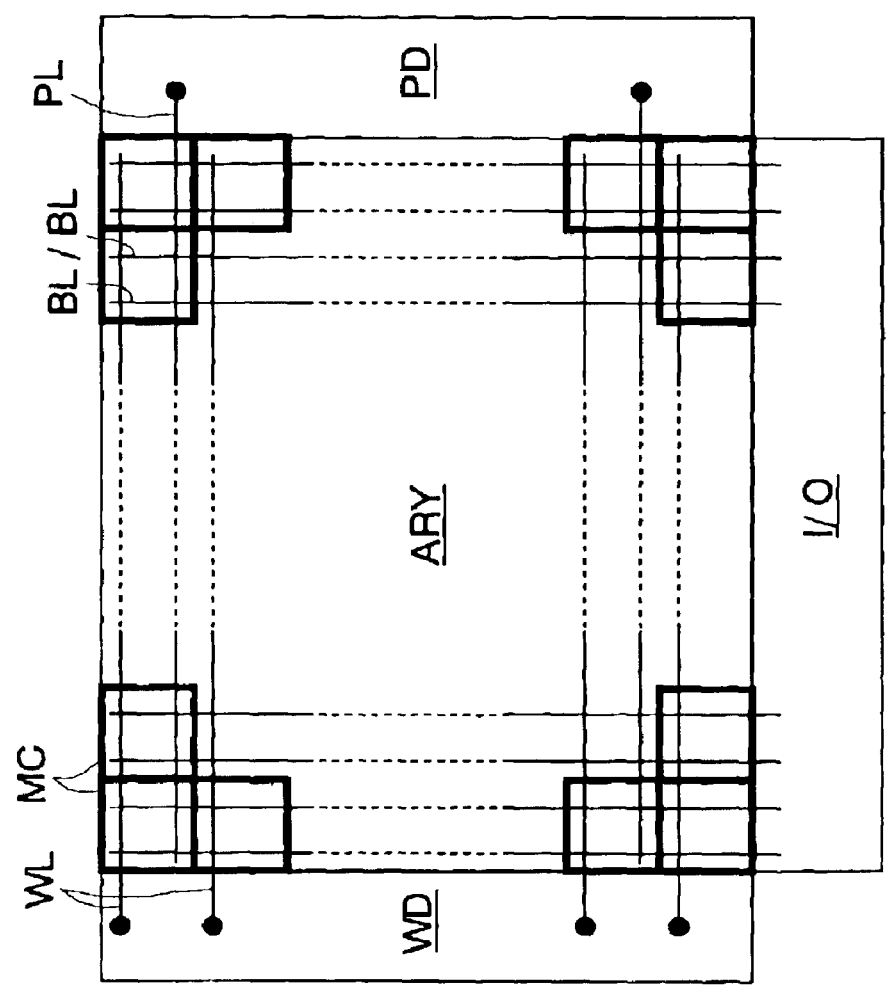
FIG. 2 is a block diagram showing the details of the ferroelectric memory of FIG. 1.

FIG. 2 shows the details of the ferroelectric memory 32 shown in FIG. 1.

The ferroelectric memory 32 includes a memory array ARY having 8 kbits of memory cells, a word line driver WD for driving 256 word lines WL, a plate line driver PD for driving 128 plate lines PL, and a data input/output circuit I/O including eight sense amplifiers which are connected to 32 complementary bit line pairs BL, /BL through multiplexers.

The ferroelectric memory 32 has inherent information (title, author, publication date, lending date, etc.) of the book to which the RFID transponder RTAG is attached. Not the foregoing reader/writer 12 at the gate but a reader/writer installed on the library's lending counter or the like performs write operations and read operations on the ferroelectric memory 32. That is, library clerks accesses to the ferroelectric memory 32. Here, the RFID transponder RTAG is brought to a position close to the reader/writer 12. The semiconductor integrated circuit IC is thus supplied with power sufficient to operate the ferroelectric memory 32.

For example, in a read operation, any of the word lines WL is selected according to an address from the reader/writer 12. Data is read from 32 memory cells MC that are connected to the selected word line WL. The read data is amplified by the sense amplifiers of the data input/output circuit I/O. Then, eight bits of the data amplified by the sense amplifiers are transmitted to the reader/writer 12.

FIG. 3 shows the details of the memory cells MC of the ferroelectric memory 32 shown in FIG. 2. The memory cells MC have two ferroelectric capacitors FC1 and FC2 each. The ferroelectric capacitor FC1 is connected to a bit line BL through a transfer transistor T1. The ferroelectric capacitor FC2 is connected to a bit line /BL through a transfer transistor T2. When data "1" is written to the ferroelectric capacitor FC1, data "0" is written to the ferroelectric capacitor FC2. That is, each memory cell MC stores a single bit of data in its two ferroelectric capacitors FC1 and FC2. Memory cells MC of this type are generally referred to as 2T2C type.

FIG. 4 shows the details of the ferroelectric latch 30 shown in FIG. 1.

The ferroelectric latch 30 includes a latch circuit 32a having two CMOS inverters (buffer circuits) which are connected to each other at their inputs and outputs, a switch circuit 32b consisting of a pMOS transistor, a switch circuit 32c consisting of an nMOS transistor, ferroelectric capacitors LFC1, LFC2, LFC3, and LFC4, switch circuits 32d, 32e, 32f, and 32g consisting of an nMOS transistor each, nMOS transistors 32h, 32i, 32j, and 32k, and CMOS switches 32m and 32n.

The switch circuit 32b connects the sources of the pMOS transistors (not shown) of the two CMOS inverters to the power supply line VDD1 according to an enable signal ENX. The switch circuit 32c connects the sources of the nMOS transistors (not shown) of the two CMOS inverters to the ground line VSS according to an enable signal EN. That is, the latch circuit 32a functions as a volatile memory circuit for holding data when the power supply voltage VDD1 is given.

The switch circuit 32d and the ferroelectric capacitor LFC1 are connected in series between one of the inputs of the latch circuit 32a, or a first node N, and a first plate line PL1. The switch circuit 32e and the ferroelectric capacitor LFC2 are connected in series between the first node N and a second plate line PL2. That is, the ferroelectric capacitors LFC1 and LFC2 (a pair of first ferroelectric capacitors) are connected in series between the first and second plate lines PL1 and PL2.

The switch circuit 32f and the ferroelectric capacitor LFC3 are connected in series between the other input of the latch circuit 32a, or a second node NX, and the first plate line PL1. The switch circuit 32g and the ferroelectric capacitor LFC4 are connected in series between the second node NX and the second plate line PL2. That is, the ferroelectric capacitors LFC3 and LFC4 (a pair of second ferroelectric capacitors) are connected in series between the first and second plate lines PL1 and PL2.

The switch circuits 32d and 32f turn on according to a store signal STO1. The switch circuits 32e and 32g turn on according to a store signal STO2. The directions of the arrows given to the ferroelectric capacitors LFC1–LFC4 show an example of the polarization state. The electrodes at the head sides of the arrows are charged positively. Incidentally, in order to raise the write voltage of the ferroelectric capacitors LFC1–LFC4, the switch circuits 32d, 32e, 32f, and 32g may be made of CMOS transmission gates (CMOS switches) rather than the nMOS transistors.

The nMOS transistor 32h connects the connection node between the ferroelectric capacitor LFC1 and the switch circuit 32d to the ground line VSS according to a reset signal RES1. The nMOS transistor 32i connects the connection node between the ferroelectric capacitor LFC2 and the switch circuit 32e to the ground line VSS according to a reset signal RES2. The nMOS transistor 32j connects the connection node between the ferroelectric capacitor LFC3 and the switch circuit 32f to the ground line VSS according to the reset signal RES1. The nMOS transistor 32k connects the connection node between the ferroelectric capacitor LFC4 and the switch circuit 32g to the ground line VSS according to the reset signal RES2.

The CMOS switch 32m connects the input IN of the ferroelectric latch 30 to the first node N. The CMOS switch 32m turns on when a clock signal CK is at low level (=a clock signal CKX is at high level). The CMOS switch 32n connects the output of the latch circuit 32a (the inverted phase of the second node NX) to the first node N. The CMOS switch 32n turns on when the clock signal CK is at high level (=the clock signal CKX is at low level).

The control circuit 34 has a first plate voltage generator 34a, a switch control circuit 34b, and a second plate voltage generator 34c. The first plate voltage generator 34a supplies a first plate voltage PL1 to the first plate line PL1. The second plate voltage generator 34c supplies a second plate voltage PL2 to the second plate line PL2. The switch control circuit 34b outputs the store signals STO1 and STO2, the reset signals RES1 and RES2, and the enable signals ENX and EN. The control circuit 34 also supplies to the input IN data to be written to the ferroelectric latch 30, and receives data read out of the ferroelectric latch 30 from the output OUT.

The ferroelectric latch 30 has a large number of devices and a large layout size. Because of the number of memory bits as low as 1 bit, however, it occupies a small ratio to the area of the semiconductor integrated circuit IC. Consequently, an increase in the area of the semiconductor integrated circuit IC resulting from the formation of the ferroelectric latch 30 is negligible.

Figure 5:
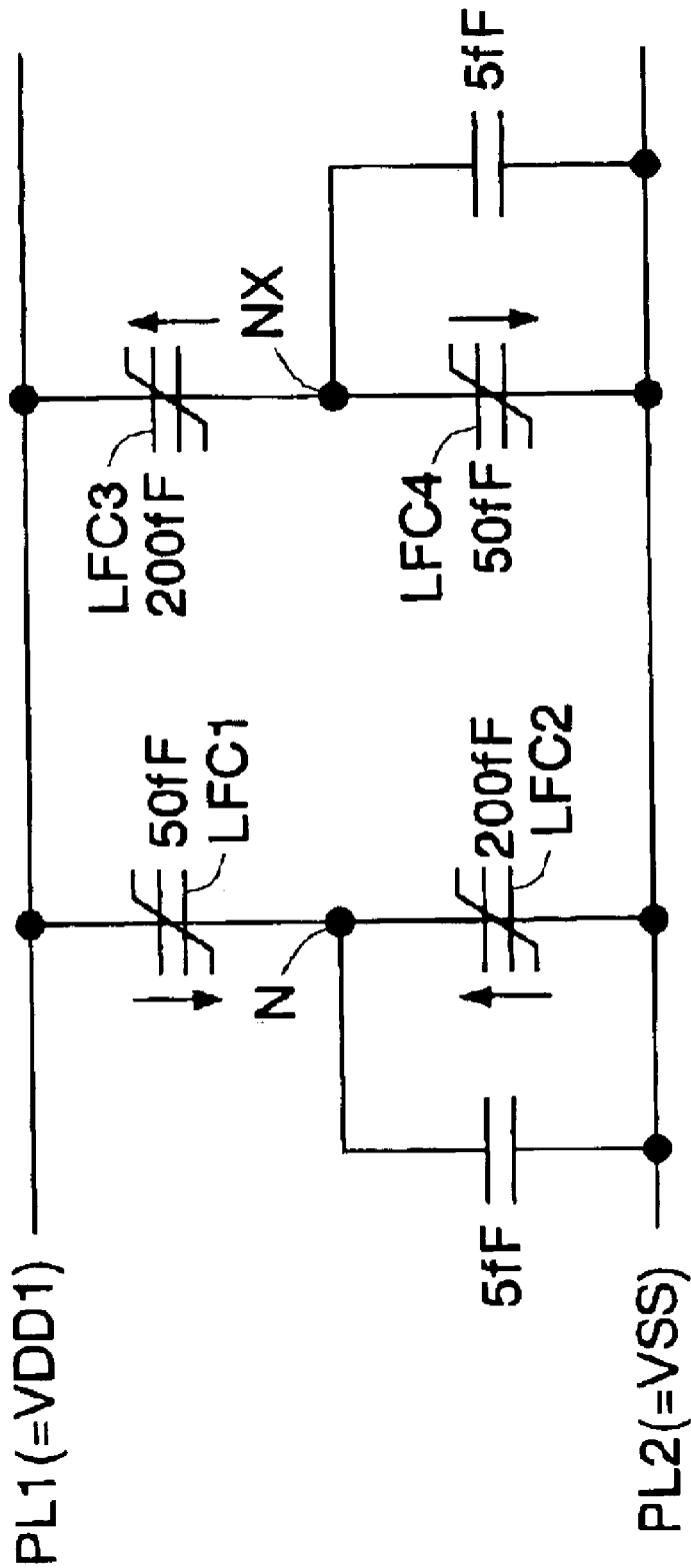
FIG. 5 is an equivalent circuit diagram of the capacitors in the ferroelectric latch shown in FIG. 4.

FIG. 5 shows an equivalent circuit of the capacitors in the ferroelectric latch 30 shown in FIG. 4. In this example, the ferroelectric latch 30 holds logic "H" in advance. Here, the latch circuit 32a outputs low level and high level to the first node N and the second node NX, respectively. Hereinafter, description will be given on the assumption that the store signals STO1, STO2 are held at high level and the reset signals RES1, RES2 at low level.

Before power-off, the first plate voltage generator 34a changes the first plate voltage PL1 to low level, high level, and low level. The second plate voltage generator 34c changes the second plate voltage PL2 to low level, high level, and low level. It follows that the low level of the node N and the high level of the node NX are written as the residual polarizations of the respective ferroelectric capacitors LFC1–LFC4.

In this example, the average capacitances of the ferroelectric capacitors LFC1–LFC4 shall be 50 fF, 200 fF, 200 fF, and 50 fF, respectively, under the polarization state where the first plate vole PL1 is biased to the power supply voltage VDD1 and the second plate voltage PL2 to the ground voltage VSS. The parasitic capacitances of the nodes N and NX shall be both 5 fF when the second plate voltage PL2 is grounded.

Figure 6:
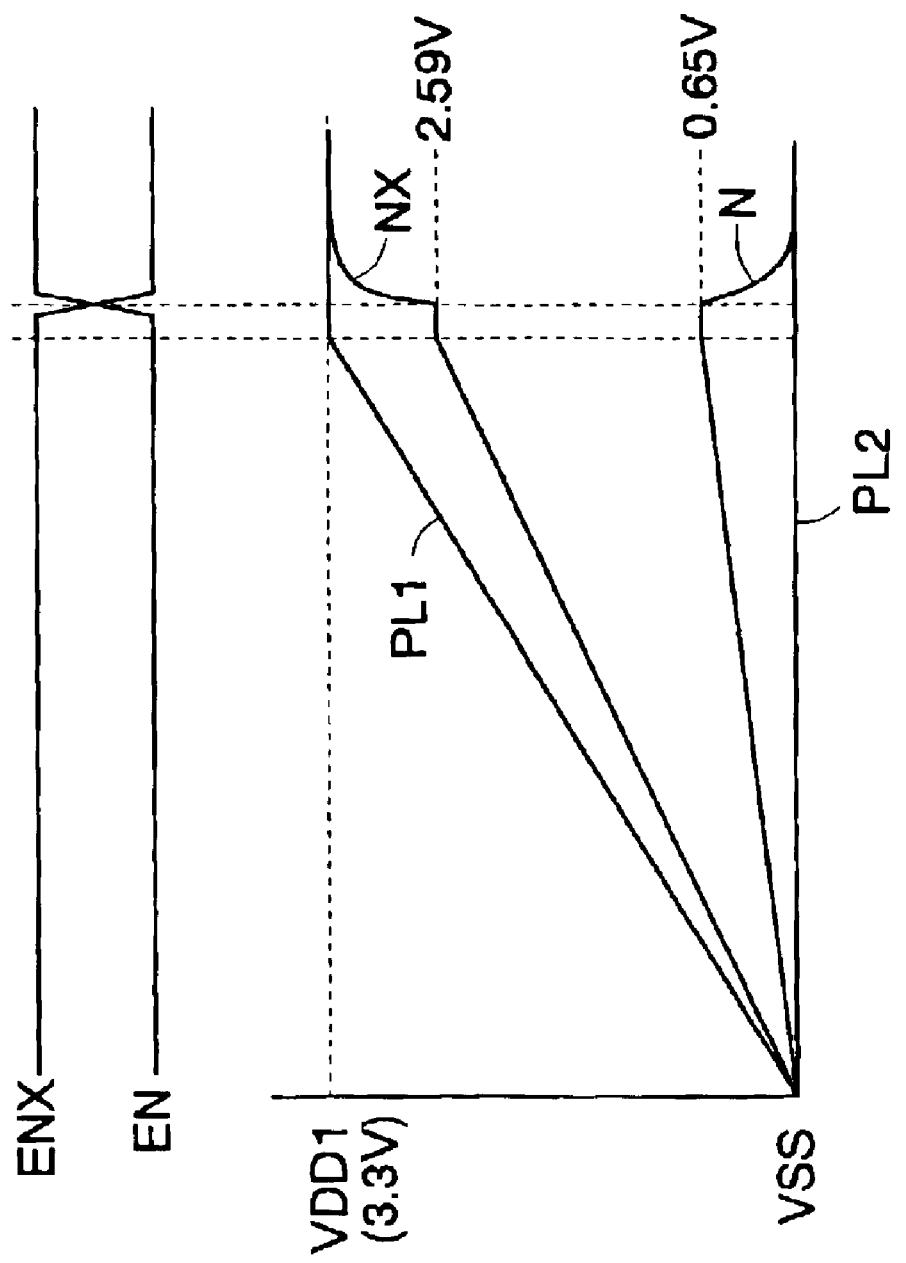
FIG. 6 is a waveform chart showing the basics of a recall operation of the ferroelectric latch shown in FIG. 4.

FIG. 6 shows the basics of a read operation of the ferroelectric latch 30 in the polarization state shown in FIG. 5. At power-on, the clock signals CK and CKX are fixed to high level and low level, respectively. That is, the pair of CMOS inverters of the latch circuit 32a shown in FIG. 4 forms a feedback loop.

The first plate voltage generator 34a generates the first plate voltage PL1. The first plate voltage PL1 rises to the predetermined power supply voltage VDD1 (for example, 3.3 V). The second plate voltage generator 34c outputs the ground voltage VSS as the second plate voltage PL2.

While the first plate voltage PL1 is on the rise, the switch control circuit 34b outputs the enable signal ENX of high level and the enable signal EN of low level. The enable signal ENX of high level and the enable signal EN of low level cause the switch circuits 32b and 32c to turn off, and inactivate the latch circuit 32a. As a result, the nodes N and NX become floating.

The voltage of the node N rises with the rising first plate voltage PL1, according to the capacitance division between the ferroelectric capacitors LFC1 and LFC2. The voltage of the node NX rises with the rising first plate voltage PL1, according to the capacitance division between the ferroelectric capacitors LFC3 and LFC4.

When the first plate voltage PL1 reaches the power supply voltage VDD1 (3.3 v), the node N has a voltage of 0.65 V (3.3 V×50 fF/(5 fF+50 fF+200 fF)). The node NX has a voltage of 2.59 V (3.3 V×200 fF/(5 fF+50 fF+200 fF)). That is, since the ferroelectric capacitors LFC1, LFC2 and the ferroelectric capacitors LFC3, LFC4 are both connected in series and their intermediate nodes are connected to the nodes N and NX, respectively, the voltage difference (offset voltage) between the nodes N and NX widens to 1.84 V.

Read operations of the ferroelectric memory 32 shown in FIG. 3 cause a voltage difference of approximately 200 mV between the bit lines BL and /BL. That is, the ferroelectric latch 30 has a read margin much greater than that of the ferroelectric memory 32. Consequently, the data held by the ferroelectric latch 30 can be read with reliability even if the RFID transponder RTAG and the reader/writer 12 are wide apart and the power supplied from the reader/writer 12 is low. Moreover, lowering the output power of the reader/writer 12 results in reducing the effect of the electromagnetic waves emitted from the reader/writer 12.

Subsequently, the enable signals EN and ENX change to high level and low level, respectively, whereby the latch circuit 32a is activated. The latch circuit 32a amplifies the voltage difference of 1.84 v, so that the voltages of the nodes N and NX become the ground voltage VSS and the power supply voltage VDD1, respectively. As a result, the data corresponding to the residual polarizations of the ferroelectric capacitors LFC1–LFC4 is read into the latch circuit 32a. That is, through a recall operation, the data that has been held by the latch circuit 32a before the power-off is reproduced.

Figure 7:
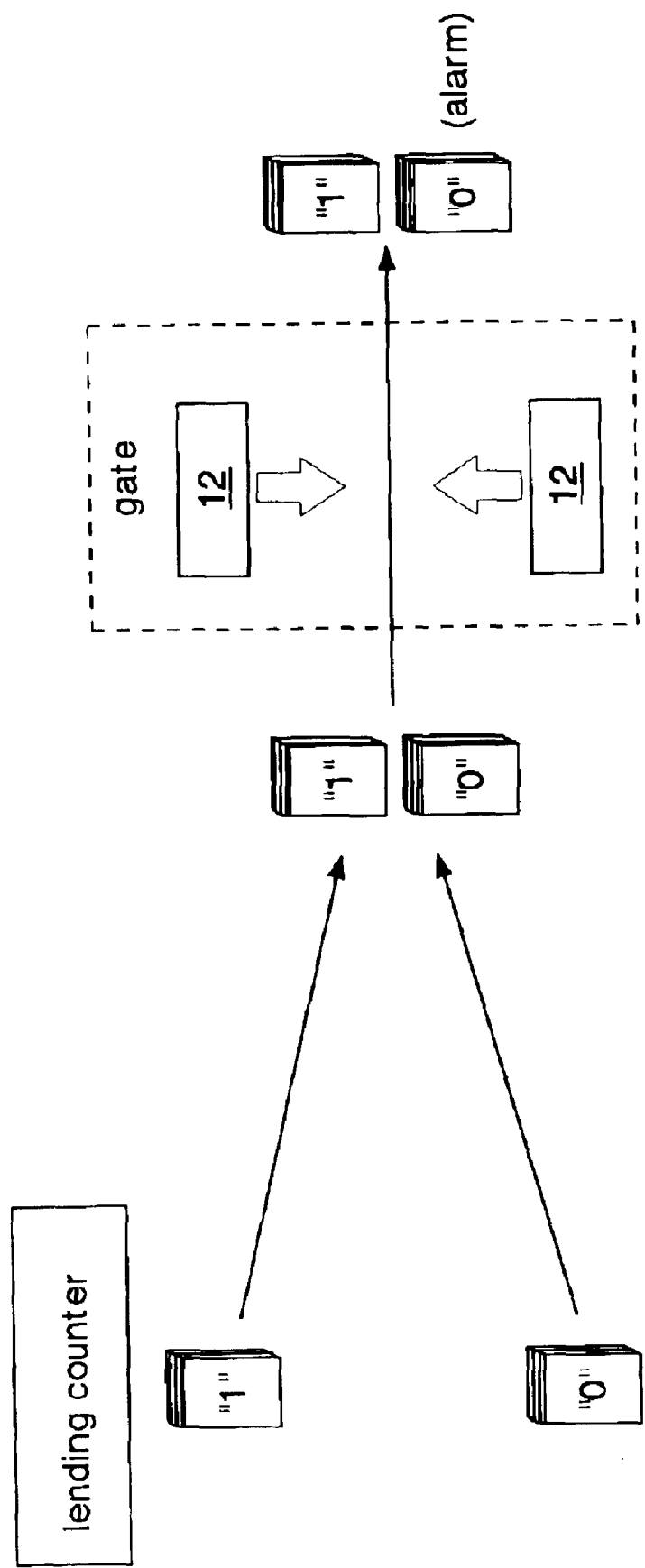
FIG. 7 is an explanatory diagram showing an overview of operation of the first embodiment.

FIG. 7 shows an overview of the store operation (write operation) and recall operation (read operation) to the ferroelectric latch 30. The outlined arrows given to the gate show the directions of emission of the magnetic field.

Initially, at the lending counter of the library, the RFID transponder RTAG attached to a book to lend is brought close to the RTAG reader/writer for lending processing. The RFID transponder RTAG receives power and data "1", which indicates "lending", from the reader/writer. The data "1" is stored into the ferroelectric latch 30 (the ferroelectric latch 30 becomes logic "1" in output OUT).

When a person with a borrowed book passes through the gate, the RFID transponder RTAG receives power and a "recall command" for performing a recall operation on the ferroelectric latch 30, from the reader/writer 12 at the gate. The control circuit 34 of the RFID transponder RTAG performs a recall operation on the ferroelectric latch 30. The RFID transponder RTAG sends back no response to the reader/writer 12 when "1" is read from the ferroelectric latch 30.

In the absence of a response from the RFID transponder RTAG, the reader/writer 12 determines that a book passing through the gate is one with the lending processing performed. More specifically, when the RFID transponder RTAG makes no response, the reader/writer 12 cannot detect if the book is passing through the gate. Nevertheless, books with the lending processing performed need not be detected in terms of security.

On the other hand, when a person having a book without going through the lending process passes through the gate, the RFID transponder RTAG reads data "0" from the ferroelectric latch 30 and sends back data that indicates "yet to lend" to the reader/writer 12. The reader/writer 12 informs the system control apparatus 10 of being "yet to lend". The system control apparatus 10 issues an alarm to inform people nearby that a book "yet to lend" is passing through the gate.

Figure 8:
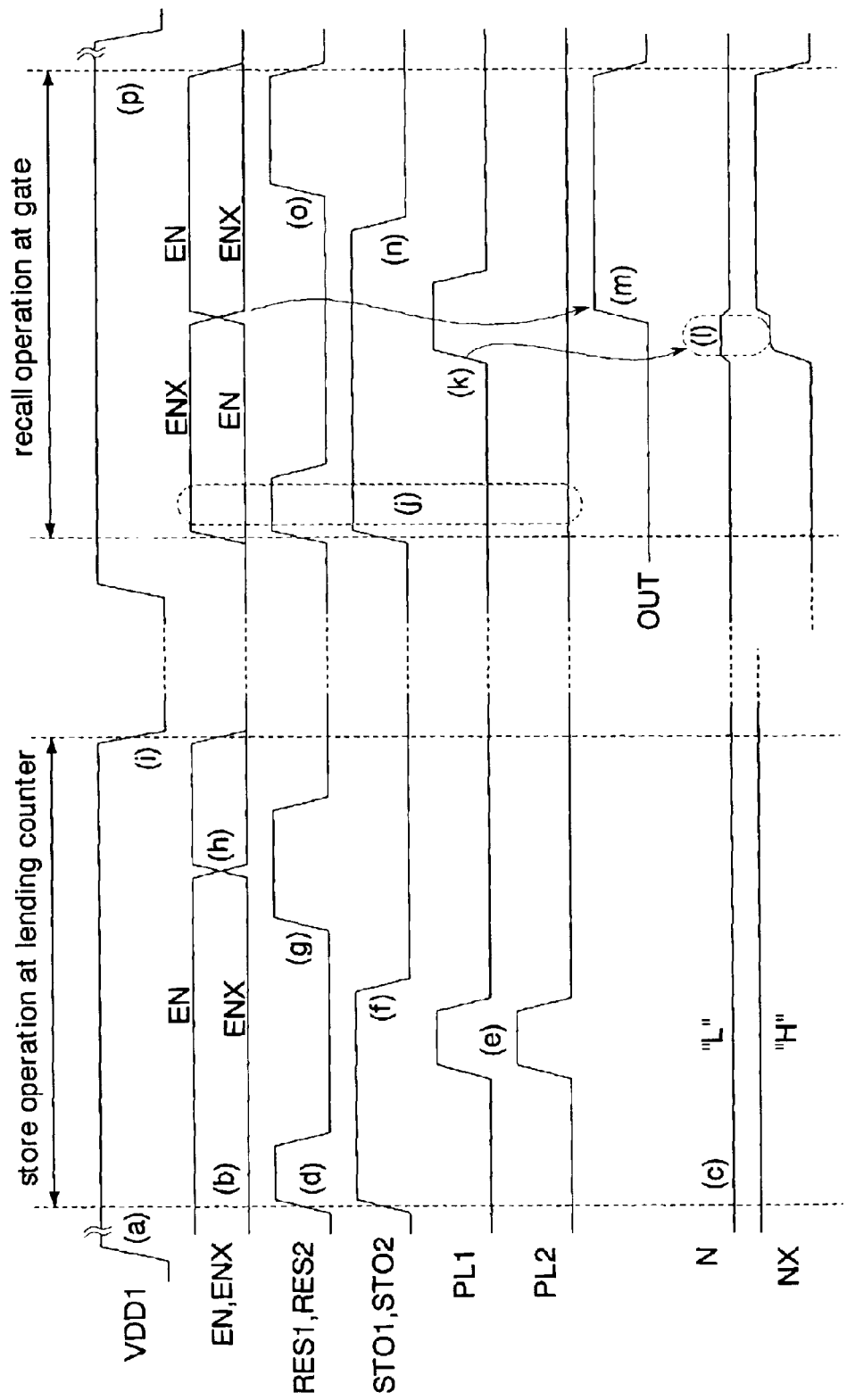
FIG. 8 is a timing chart showing the operation of the RFID transponder according to the first embodiment.

FIG. 8 shows the operation of the semiconductor integrated circuit IC implemented on the RFID transponder RTAG. Incidentally, the operation of the CMOS switches 32m and 32n in the ferroelectric latch 30 (the timing of the clocks CK and CKX) will be omitted from the following description.

Initially, in the case of lending a book, the data "1" is stored into the ferroelectric latch 30 of the RFID transponder RTAG attached to the book at the lending counter. The RFID transponder RTAG, when brought close to the reader/writer, converts the radio wave (magnetic force) from the reader/writer into electric power. The semiconductor integrated circuit IC generates the power supply voltage VDD1 in accordance with the magnetic field intensity. At the lending counter, the RFID transponder RTAG is put close to the reader/writer. The power supply voltage VDD1 thus rises to a voltage sufficient to operate all the circuits in the integrated circuit IC (FIG. 8(a)).

The semiconductor integrated circuit IC is initialized by the supply of the power supply voltage VDD1, and generates the enable signal ENX and plate voltages PL1, PL2 of low level and the enable signal EN and store signals STO1, ST02 of high level. Before the start of data storing, the power supply voltage VDD1 rises to a voltage that allows circuit operation, and the enable signals EN and ENX change to high level and low level, respectively (FIG. 8(b)). Consequently, the voltages to be stored (in this example, the data "1" transmitted from the reader/writer) are transferred to the first node N and the second node NX (FIG. 8(c)).

The reset signals RES1 and RES2 change to high level for a predetermined period (FIG. 8(d)). The store signals STO1 and ST02 of high level connect the ferroelectric capacitors LFC1, LFC2 to the node N and the ferroelectric capacitors LFC3, LFC4 to the node NX.

Next, the semiconductor integrated circuit IC changes the plate voltages PL1 and PL2 to high level for a predetermined period (FIG. 8(e)). By this operation, the logic levels of the nodes N and NX are written into the ferroelectric capacitors LFC1, LFC2 and the ferroelectric capacitors LFC3, LFC4, respectively. The ferroelectric capacitors LFC1–LFC4 are in the polarization state shown by the arrows in FIG. 4. That is, the ferroelectric latch 30 operates as a nonvolatile data memory circuit.

Subsequently, the store signals STO1 and ST02 change to low level, thereby releasing the connection between the node N and the ferroelectric capacitors LFC1, LFC2 and the connection between the node NX and the ferroelectric capacitors LFC3, LFC4 (FIG. 8(f)). Next, the reset signals RES1 and RES2 change to high level (FIG. 8(g)). Since the plate voltages PL1 and PL2 are already at low level, no voltage difference occurs between both ends of the ferroelectric capacitors LFC1–LFC4 after the reset signals RES1 and RES2 change to high level. This prevents the ferroelectric capacitors LFC1–LFC4 from varying in residual polarization value.

Next, the enable signals EN and ENX change to low level and high level, respectively, whereby the latch circuit 32a is inactivated (FIG. (8(h)). When the store operation is completed and the RFID transponder RTAG get away from the reader/writer, the power supply voltage VDD1 falls because the power supply stopped (FIG. 8(i)).

Subsequently, the book with the lending processing performed at the lending counter passes through the gate, in which case the RFID transponder RTAG converts the radio wave (magnetic force) from the reader/writer 12 of the gate into power. Since the reader/writer 12 and the RFID transponder RTAG are away from each other by a predetermined distance, the power generated by the semiconductor integrated circuit IC is lower than at the lending counter. For example, this power is not strong enough to operate the ferroelectric memory 32 but enough to operate logic circuits including the ferroelectric latch 30. That is, the RFID transponder RTAG of the present invention is operable even with such low power that the conventional RFID transponder implementing a ferroelectric memory alone cannot run on.

As described above, the semiconductor integrated circuit IC is initialized by the supply of the power supply voltage VDD1 (FIG. 8(j)). Initializing the input node N and output node NX of the latch circuit 32a shown in FIG. 4 to 0 V can ensure the subsequent recall operation on the ferroelectric capacitors LFC1–LFC4 and the latch circuit 32a.

Next, the RFID transponder RTAG receives from the reader/writer 12 a request command for checking the affirmation or negation of the lending processing, and starts the recall operation on the ferroelectric latch 30. More specifically, the plate voltage PL1 changes to high level for a predetermined period with the plate voltage PL2 kept at low level (FIG. 8(k)). By this operation, the nodes N and NX rise in voltage according to the capacitance division of the ferroelectric capacitors LFC1, LFC2 and that of the ferroelectric capacitors LFC3, LFC4, as shown in FIG. 6. That is, the data held by the ferroelectric capacitors LFC1–LFC4 is read out to the nodes N and NX (FIG. 8(l)).

Next, the enable signals EN and ENX change to high level and low level, respectively, so that the data held by the ferroelectric capacitors LFC1–LFC4 is amplified and latched by the latch circuit 32a (FIG. 8(m)). The data latched by the latch circuit 32a (the data "1" on the node NX) indicates that the lending processing is completed. The RFID transponder RTAG thus makes no response to the reader/writer 12.

If the data read from the ferroelectric capacitors LFC1–LFC4 indicates that the lending processing is yet to be done (data "0" on the node NX), this information is transmitted to the reader/writer 12 through the control circuit 34, the data modulator 36, and the antenna coil 24 with the result of an alarm.

Subsequently, the semiconductor integrated circuit IC changes the store signals STO1 and ST02 to low level (FIG. 8(n)), and changes the reset signals RES1 and RES2 to high level for a predetermined period (FIG. 8(o)). As described above, the reset signals RES1, RES2 of high level and the plate voltages PL1, PL2 of low level prevent the ferroelectric capacitors LFC1–LFC4 from varying in residual polarization value.

When the recall operation is completed and the RFID transponder RTAG get away from the reader/writer, the power supply voltage VDD1 falls since the power is no longer available (FIG. 8(p)).

As above, according to the first embodiment, the data indicating whether or not the lending processing has been performed on the book is held by the ferroelectric latch 30 which is low in power consumption. This can realize a reliable theft prevention even if the power the RFID transponder RTAG receives is low.

The two pairs of ferroelectric capacitors LFC1, LFC2 and LFC3, LFC4 are both connected in series between the first and second plate lines PL1 and PL2. It is hence possible to generate voltages on the nodes N and NX in accordance with the capacitance divisions resulting from the residual polarization values of the ferroelectric capacitors LFC1, LFC2 and LFC3, LFC4. That is, the data that is transferred from the latch circuit 32a to the ferroelectric capacitors LFC1–LFC4 before power-off can be reproduced. In short, it is possible to perform a recall operation.

At the time of the recall operation, the first plate line PL1 has only to drive the four ferroelectric capacitors LFC1–LFC4. This allows a significant reduction in the power consumption during the recall operation. That is, the communication range between the RFID transponder RTAG and the reader/writer 12 can be extended. Consequently, the semiconductor integrated circuit IC of the present invention can be implemented on the RFID transponder RTAG to constitute a surely operable antitheft system etc. Besides, the gate can be widened in breadth. Otherwise, the output of the reader/writer 12 can be lowered to reduce the influences of the electromagnetic waves, which are emitted from the reader/writer 12, on humans.

The combination of the large-capacity ferroelectric memory 32 and the low-power ferroelectric latch 30 allows such uses that the ferroelectric memory 32 is operated at the lending counter where high power is available, and the ferroelectric latch 30 is operated at the gate where only low power is available. As a result, a security system of great convenience can be constructed.

Since the semiconductor integrated circuit IC contains an ordinary ferroelectric memory 32, the semiconductor integrated circuit IC can be increased in data memory capacity.

Figure 9:
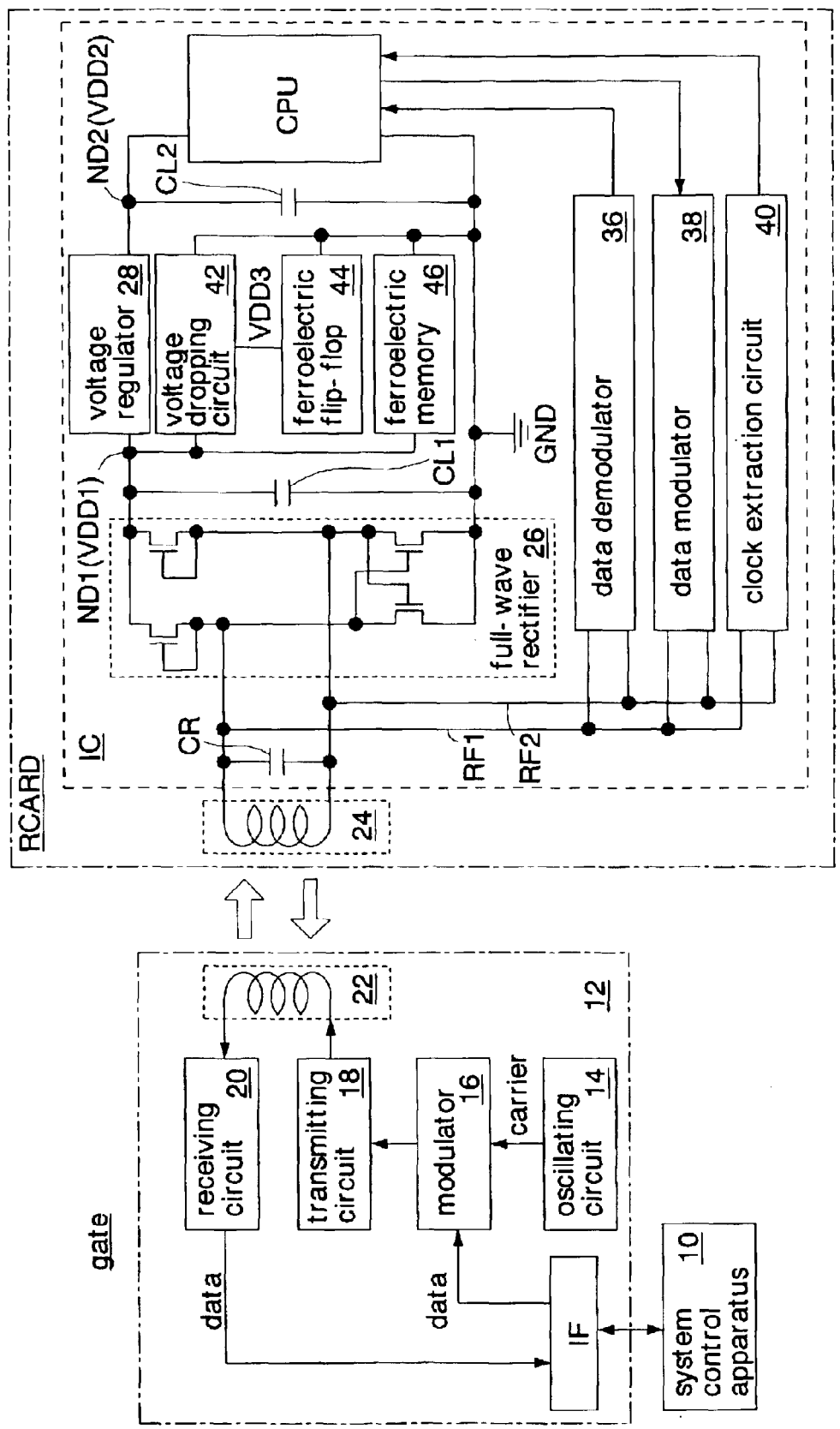
FIG. 9 is a block diagram showing a second embodiment of the present invention.

FIG. 9 shows a second embodiment of the present invention. The same circuits and signals as those described in the first embodiment will be designated by identical reference numbers or symbols. Detailed description thereof will be omitted here.

FIG. 9 shows a security system which includes a laboratory's exit gate incorporating a reader/writer 12 and ID cards RCARD (visitor cards) to be handed to visitors to the laboratory. This security system adopts ISO/IEC 15693 Part 2 for its communication interface. Nevertheless, the present invention is not dependent on communication interfaces but may adopt a variety of communication interfaces that are registered as international standards.

Each ID card RCARD implements an antennal coil 24 and a semiconductor integrated circuit IC, and functions as a non-contact IC card (smart card). The semiconductor integrated circuit has a ferroelectric flip-flop 44 (ferroelectric holding circuit), a ferroelectric memory 46, and a CPU instead of the ferroelectric latch 30, the ferroelectric memory 32, and the control circuit 34 of the first embodiment. The semiconductor integrated circuit IC also has a voltage dropping circuit 42 (internal voltage regulating circuit) which steps down the power supply voltage VDD1 to an internal supply voltage VDD3 (for example, 2.0 V) and supplies the same to the ferroelectric flip-flop 44. The rest of the configuration is the same as in the first embodiment.

Figure 10:
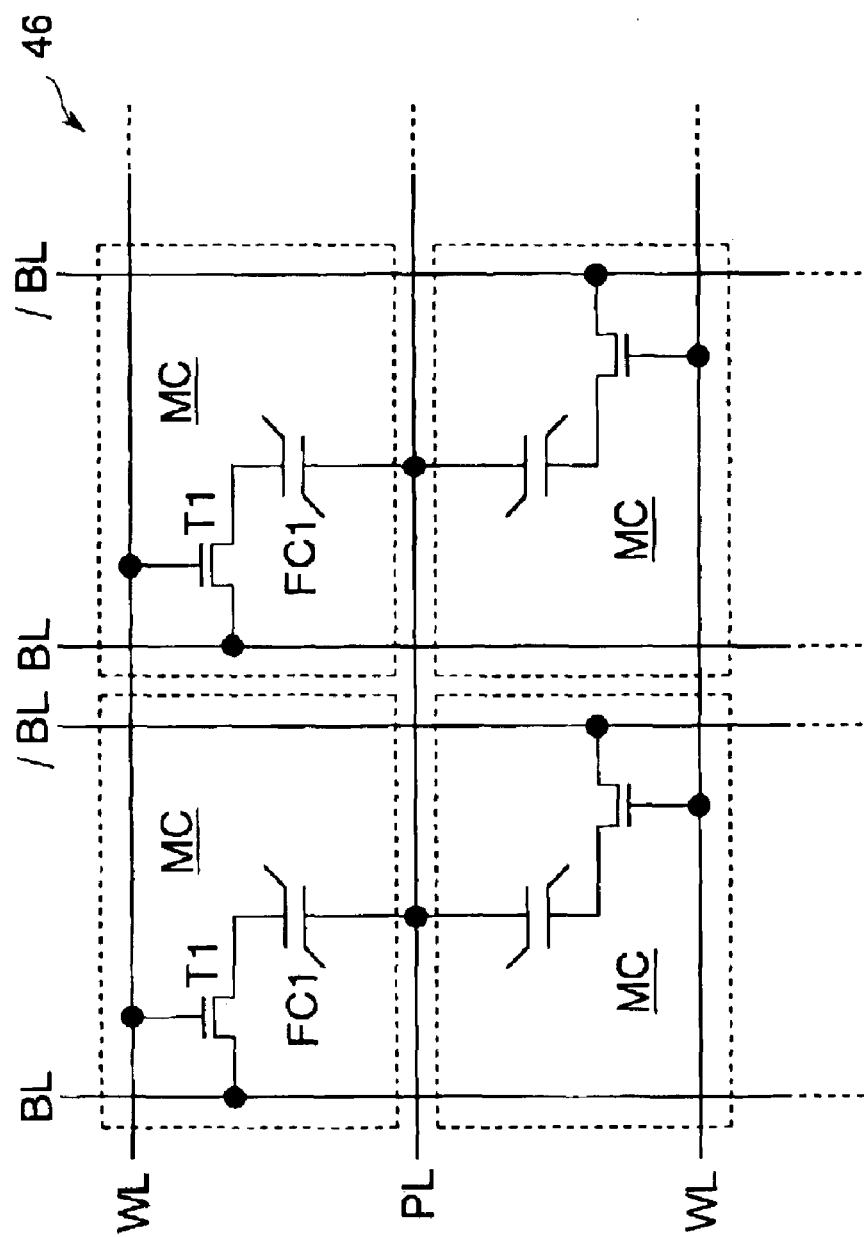
FIG. 10 is a circuit diagram example showing the details of the memory cells in the ferroelectric memory of FIG. 9.

FIG. 10 shows the details of the memory cells MC of the ferroelectric memory 46 shown in FIG. 9. The memory cells MC each have a ferroelectric capacitor FC1 which is connected to a bit line BL through a transfer transistor T1. In general, memory cells MC of this type is referred to as 1T1C type, storing a single bit of data in the single ferroelectric capacitor FC1. Although it is not shown in FIG. 10, memory cell data is detected by the use of a reference capacitor.

Figure 11:
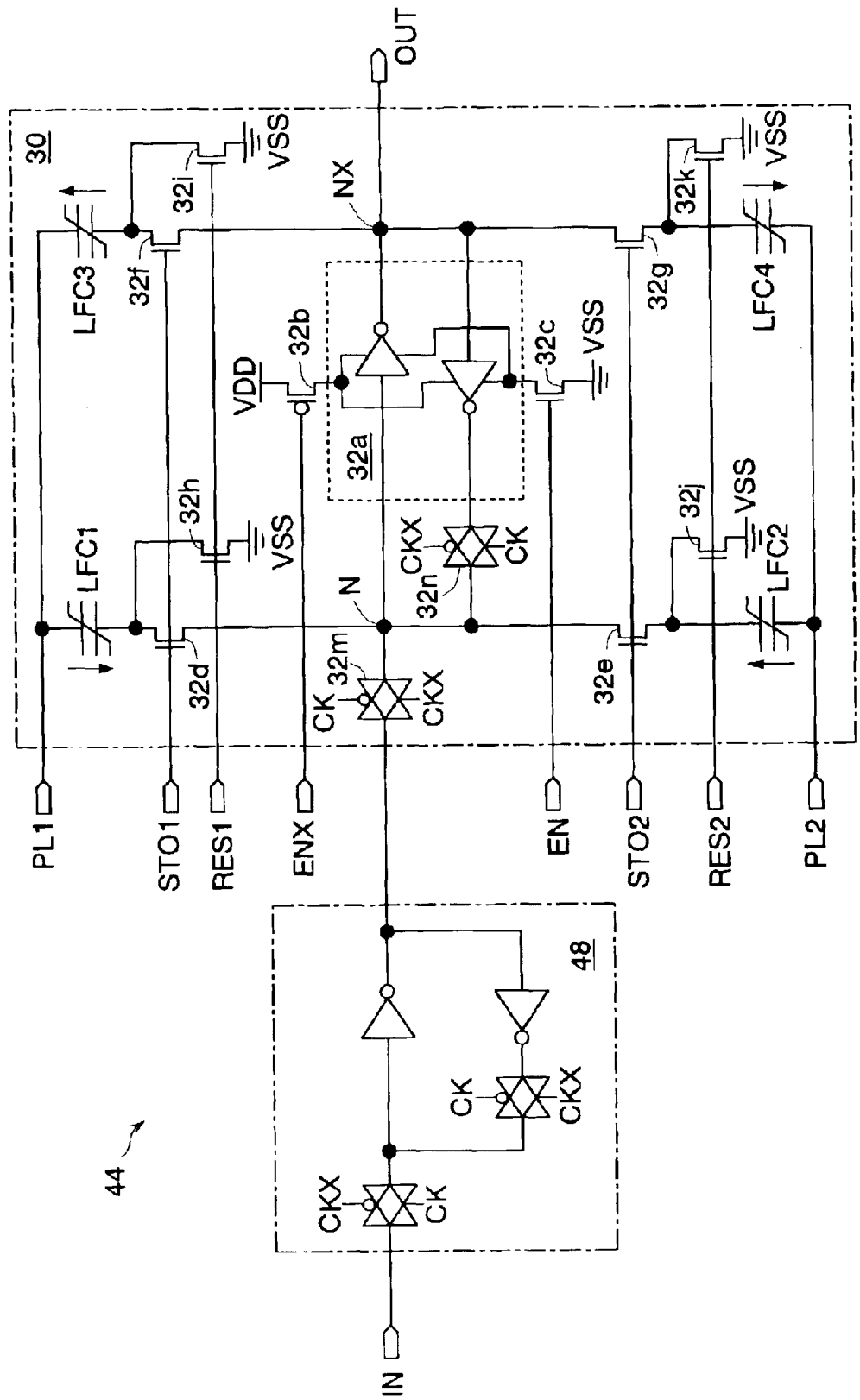
FIG. 11 is a circuit diagram showing the details of the ferroelectric flip-flop of FIG. 9.

FIG. 11 shows the details of the ferroelectric flip-flop 44 shown in FIG. 9.

The ferroelectric flip-flop 44 is formed by connecting a volatile latch circuit 48 and a nonvolatile ferroelectric latch 30 in series. The latch circuit 48 has a latch consisting of two CMOS inverters connected to each other at their inputs and outputs, and two CMOS switches. The latch circuit 48 functions as a master latch circuit, and the ferroelectric latch 30 as a slave latch circuit. Hence, the data held in the slave latch circuit is reproduced by a recall operation after power-on.

In this embodiment, researchers write data that indicates "visited" to the ID cards RCARD of visitors. When the visitors pass through the exit gate which is installed at the exit of the laboratory, an alarm is issued if the ferroelectric flip-flops 44 do not have the data that indicates "visited".

This embodiment can offer the same effects as those of the foregoing first embodiment. Moreover, in the present embodiment, the voltage dropping circuit 42 steps down the power supply voltage VDD1 to generate the power supply voltage VDD3 which is supplied to the ferroelectric flip-flop 44. The ferroelectric flip-flop 44 can thus be lowered in power consumption, allowing a reduction in the power consumption of the semiconductor integrated circuit IC. As a result, the communication range between the ID cards RCARD and the reader/writer 12 can be extended further.

In addition, since the memory cells MC of the ferroelectric memory 46 are composed of a single ferroelectric capacitor and a single transfer transistor each, the ferroelectric memory 46 can be formed smaller. As a result, the semiconductor integrated circuit IC can be reduced in chip size with a reduction in fabrication cost.

Figure 12:
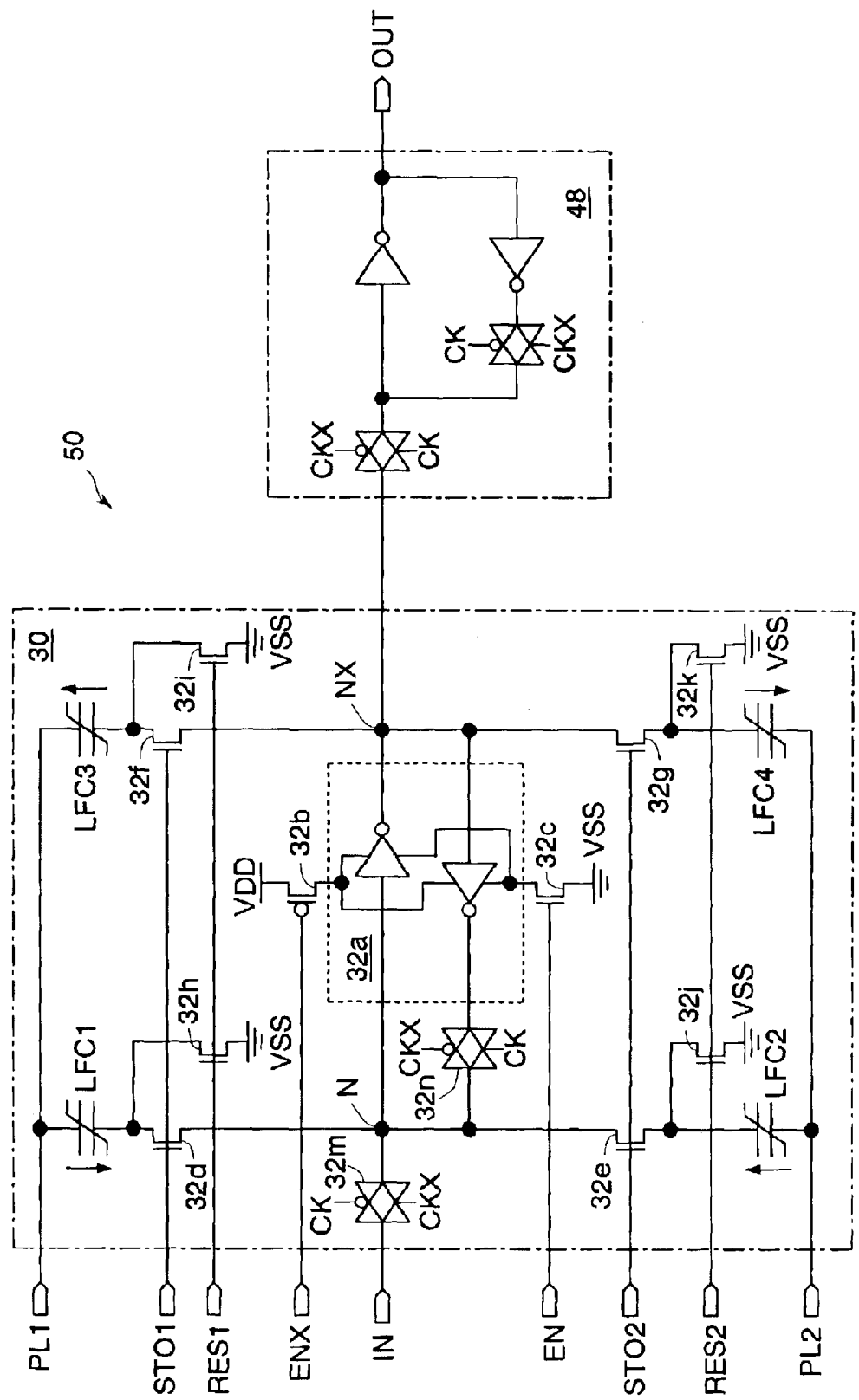
FIG. 12 is a circuit diagram showing the details of a ferroelectric flip-flop according to a third embodiment of the present invention.

FIG. 12 shows a ferroelectric flip-flop according to a third embodiment of the present invention. The same circuits and signals as those described in the first and second embodiments will be designated by identical reference numbers or symbols. Detailed description thereof will be omitted here.

This embodiment has a ferroelectric flip-flop 50 instead of the ferroelectric flip-flop 44 of the second embodiment. The rest of the configuration is the same as in the second embodiment.

The ferroelectric flip-flop 50 is formed by connecting a nonvolatile ferroelectric latch 30 and a volatile latch circuit 48 in series. That is, the ferroelectric latch 30 functions as a master latch circuit, and the latch circuit 48 a slave latch circuit. Hence, the data held in the master latch circuit is reproduced by a recall operation after power-on.

This embodiment can offer the same effects as those obtained from the first and second embodiments described above.

Figure 13:
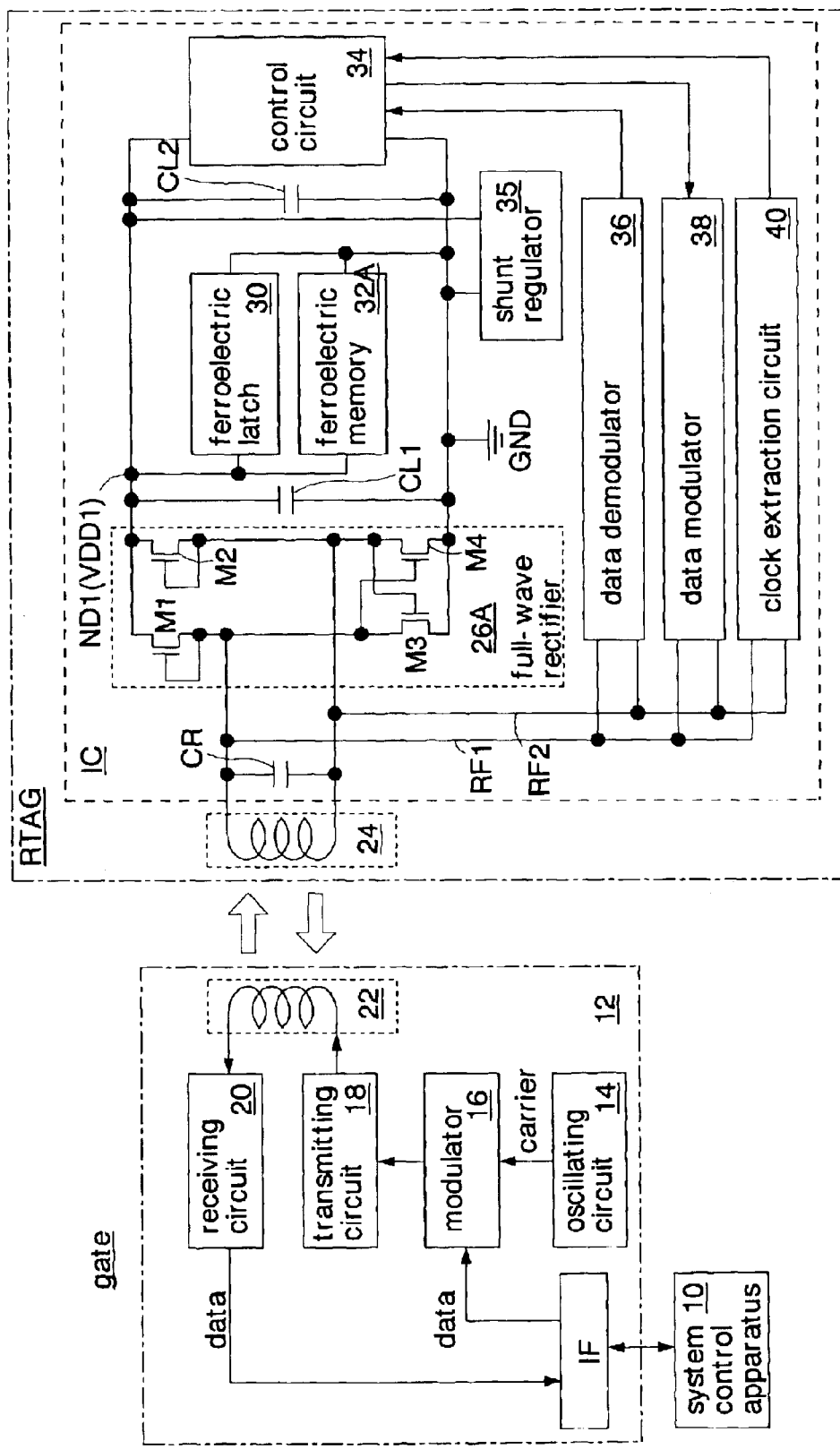
FIG. 13 is a block diagram showing a fourth embodiment of the present invention.

FIG. 13 shows a fourth embodiment of the present invention. The same circuits and signals as those described in the first embodiment will be designated by identical reference numbers or symbols. Detailed description thereof will be omitted here.

This embodiment has a full-wave rectifier 26A, a ferroelectric memory 32A, and a shunt regulator 35 instead of the full-wave rectifier 26, and the ferroelectric memory 32 and the voltage regulator 28 of the first embodiment. The rest of the configuration is the same as in the first embodiment.

The full-wave rectifier 26A generates a power supply voltage VDD1 of 2.0 V in accordance with the alternating current converted by the antenna coil 24. The ferroelectric memory 32A is an improved memory that runs on a power supply voltage of 2.0 V, achieved by the advanced semiconductor technology. Consequently, in this embodiment, all the circuits in the semiconductor integrated circuit IC can run on the single power supply voltage VDD1.

This embodiment can offer the same effects as those of the foregoing first embodiment. In addition, the ferroelectric memory 32A can also be reduced in power consumption.

The embodiments described above have dealt with the cases where the ferroelectric latch 30 or ferroelectric flip-flop 44, 50 capable of storing a single bit is formed. However, the present invention is not limited to such embodiments. For example, in the present invention, a ferroelectric latch or ferroelectric flip-flop capable of storing a plurality of bits may be formed.

The invention is not limited to the above embodiments and various modifications may be made without departing from the spirit and scope of the invention. Any improvement may be made in part or all of the components.

What is claimed is:

1. A semiconductor circuit comprising:
   a rectifier circuit for converting an alternating current into a direct-current voltage and outputting the direct-current voltage as a power supply voltage;
   a memory array having a plurality of ferroelectric memory cells; and
   a ferroelectric holding circuit having a volatile holding circuit and a plurality of ferroelectric capacitors.

2. The semiconductor integrated circuit according to claim 1, comprising
   an internal voltage regulating circuit for generating for generating an internal supply voltage in accordance with said power supply voltage, said internal supply voltage being lower than said power supply voltage, wherein
   said internal supply voltage is supplied to said ferroelectric holding circuit.

3. The semiconductor integrated circuit according to claim 1, comprising:
   a data demodulator for demodulating a read command from an alternating current, the read command being a command for reading data from said ferroelectric holding circuit; and a data modulator for modulating read data into an alternating current in accordance with said read command, the read data being read from said ferroelectric holding circuit.

4. The semiconductor integrated circuit according to claim 1, comprising
a control circuit for reading data held in said ferroelectric capacitors and transferring the data to said holding circuit at the start or supply of said power supply voltage.

5. The semiconductor integrated circuit according to claim 1, wherein said ferroelectric holding circuit includes:
a volatile latch circuit having two buffer circuits connected to each oilier at their inputs and outputs;
a pair of first ferroelectric capacitors connected in series between a first plate line and a second plate line, wherein an intermediate node of said first ferroelectric capacitors is connected to the input of one of said buffer circuits;
a pair of second ferroelectric capacitors connected in series between said first plate line and said second plate line, wherein an intermediate node of said second ferroelectric capacitors is connected to the input of the other of said buffer circuits; and
a switch circuit for connecting power supply terminals of said buffer circuits to a power supply line.

6. The semiconductor integrated circuit according to claim 1, wherein:
said ferroelectric holding circuit comprises a master latch circuit and a slave latch circuit connected in cascade; and
at least either one of said master latch circuit and said slave latch circuit includes:
a volatile latch circuit having two buffer circuits connected to each other at their inputs and outputs;
a pair of first ferroelectric capacitors connected in series between a first plate line and a second plate line, wherein an intermediate node of said first ferroelectric capacitors is connected to the input of one of said buffer circuits;
a pair of second ferroelectric capacitors connected in series between said first plate line and said second plate line, wherein an intermediate node of said second ferroelectric capacitors is connected to the input of the other of said buffer circuits; and
a switch circuit for connecting power supply terminals of said buffer circuits to a power supply line.

7. The semiconductor integrated circuit according to claim 1, wherein each of said ferroelectric memory coils of said memory array includes:
two ferroelectric capacitors each connected to a plate line at one end; and
two transfer gates for connecting the other ends of said ferroelectric capacitors to bit lines of a bit line pair, respectively.

8. The semiconductor integrated circuit according to claim 1, wherein each of said ferroelectric memory cells of said memory array includes:
a ferroelectric capacitor connected to a plate line at one end; and
a transfer gate for connecting the other end of said ferroelectric capacitor to a bit line.

9. A radio frequency identification transponder comprising an antenna coil for generating an alternating current in accordance with a magnetic field, and a semiconductor integrated circuit to be supplied with said alternating current, wherein said semiconductor integrated circuit includes:
a rectifier circuit for converting said alternating current into a direct-current voltage and outputting the direct-current voltage as a power supply voltage;
a memory array having a plurality of ferroelectric memory cells; and
a ferroelectric holding circuit having a volatile holding circuit and a plurality of ferroelectric capacitors.

10. The radio frequency identification transponder according to claim 9, comprising
an internal voltage regulating circuit for generating an internal supply voltage in accordance with said power supply voltage, said internal supply voltage being lower than said power supply voltage, wherein
said internal supply voltage is supplied to said ferroelectric holding circuit.

11. The radio frequency identification transponder according to claim 9, comprising:
a data demodulator for demodulating a read command from an alternating current, the read command being a command for reading data from said ferroelectric holding circuit; and
a data modulator for modulating read data into an alternating current in accordance with said read command, the read data being read from said ferroelectric holding circuit.

12. The radio frequency identification transponder according to claim 9, comprising
a control circuit for reading data held in said ferroelectric capacitors and transferring the data to said holding circuit at the start of supply of said power supply voltage.

13. The radio frequency identification transponder according to claim 9, wherein said ferroelectric holding circuit includes:
a volatile latch circuit having two buffer circuits connected to each other at their inputs and outputs;
a pair of first ferroelectric capacitors connected in series between a first plate line and a second plate line, wherein an intermediate node of said first ferroelectric capacitors is connected to the input of one of said buffer circuits;
a pair of second ferroelectric capacitors connected in series between said first plate line and said second plate line, wherein an intermediate node of said second ferroelectric capacitors is connected to the input of the other of said buffer circuits; and
a switch circuit for connecting power supply terminals of said buffer circuits to a power supply line.

14. The radio frequency identification transponder according to claim 9, wherein:
said ferroelectric holding circuit comprises a master latch circuit and a slave latch circuit connected in cascade; and
at least either one of said master latch circuit and said slave latch circuit includes:
a volatile latch circuit having two buffer circuits connected to each other at their inputs and outputs;
pair of first ferroelectric capacitors connected in series between a first plate line and a second plate line, wherein an intermediate node of said first ferroelectric capacitors is connected to the input of one of said buffer circuits;

a pair of second ferroelectric capacitors connected in series between said first plate line and said second plate line, wherein an intermediate node of said second ferroelectric capacitors is connected to the input of the other of said buffer circuits; and a switch circuit for connecting power supply terminals of said buffer circuits to a power supply line.

15. The radio frequency identification transponder according to claim 9, wherein each of said ferroelectric memory cells of said memory array includes:

two ferroelectric capacitors each connected to a plate line at one end; and two transfer gates for connecting the other ends of said ferroelectric capacitors to bit lines of a bit line pair, respectively.

16. The radio frequency identification transponder according to claim 9, wherein each of said ferroelectric memory cells of said memory array includes:

a ferroelectric capacitor connected to a plate line at one end; and a transfer gate for connecting the other end of said ferroelectric capacitor to a bit line.

17. A non-contact IC card comprising an antenna coil for generating an alternating current in accordance with a magnetic field, and a semiconductor integrated circuit to be supplied with said alternation current, wherein said semiconductor integrated circuit includes:

a rectifier circuit for converting said alternating current into a direct-current voltage and outputting the direct-current voltage as a power supply voltage;

a memory array having a plurality of ferroelectric memory cells: and a ferroelectric holding circuit having a volatile holding circuit and a plurality of ferroelectric capacitors.

18. The non-contact IC card according to claim 17, comprising an internal voltage regulating circuit for generating an internal supply voltage in accordance with said power supply voltage, said internal supply voltage being lower than said power supply voltage, wherein said internal supply voltage is supplied to said ferroelectric holding circuit.

19. The non-contact IC card according to claim 17, comprising:

a data demodulator for demodulating a read command from an alternating current, the read command being a command for reading data from said ferroelectric holding circuit; and a data modulator for modulating read data into an alternating current in accordance with said read command, the read data being read from said ferroelectric holding circuit.

20. The non-contact IC card according to claim 17, comprising a control circuit, for reading data held in said ferroelectric capacitors and transferring the data to said holding circuit at the start of supply of said power supply voltage.

21. The lion-contact IC card according to claim 17, wherein said ferroelectric holding circuit includes:

a volatile latch circuit having two buffer circuits connected to each other at their inputs and outputs;

a pair of first ferroelectric capacitors connected in series between a first plate line and a second plate line, wherein an intermediate node or said first ferroelectric capacitors is connected to the input of one of said buffer circuits;

a pair of second ferroelectric capacitors connected in series between said first plate line and said second plate line, wherein an intermediate node of said second ferroelectric capacitors is connected to the input of the other of said buffer circuits; and a switch circuit for connecting power supply terminals of said buffer circuits to a power supply line.

22. The non-contact IC card according to claim 17, wherein:

said ferroelectric holding circuit comprises a master latch circuit and a slave latch circuit connected in cascade; and at least either one of said master latch circuit and said slave latch circuit includes:

a volatile latch circuit having two buffer circuits connected to each other at their inputs and outputs;

pair of first ferroelectric capacitors connected in series between a first plate line and a second plate line, wherein an intermediate node of said first ferroelectric capacitors is connected to the input of one of said buffer circuits;

a pair of second ferroelectric capacitors connected in series between said first plate line and said second plate line, wherein an intermediate node of said second ferroelectric capacitors is connected to the input of the other of said buffer circuits; and a switch circuit for connecting power supply terminals of said buffer circuits to a power supply line.

23. The non-contact IC card according to claim 17, wherein each of said ferroelectric memory cells of said memory array includes:

two ferroelectric capacitors each connected to a plate line at one end; and two transfer gates for connecting the other ends of said ferroelectric capacitors to bit lines of a bit line pair, respectively.

24. The non-contact IC card according to claim 17, wherein each of said ferroelectric memory cells of said memory array includes:

a ferroelectric capacitor connected to a plate line at one end; and a transfer gate for connecting the other end of said ferroelectric capacitor to a bit line.

* * * * *